US007734038B2

(12) United States Patent
Martich et al.

(10) Patent No.: US 7,734,038 B2
(45) Date of Patent: Jun. 8, 2010

(54) ELECTRICAL RECEPTACLE WITH OPEN CORNER REGION

(75) Inventors: Mark E. Martich, Barrington, RI (US); Robert M. Hathaway, Ivoryton, CT (US)

(73) Assignee: Ortronics, Inc., New London, CT (US)

(*) Notice: Subject to any disclaimer, the term of this patent is extended or adjusted under 35 U.S.C. 154(b) by 1041 days.

(21) Appl. No.: 11/415,739

(22) Filed: May 1, 2006

(65) Prior Publication Data

US 2007/0263855 A1 Nov. 15, 2007

(51) Int. Cl.
*H04M 1/00* (2006.01)

(52) U.S. Cl. .................. 379/413.04; 439/344; 439/676; 174/50; 174/53

(58) Field of Classification Search ............ 379/413.04; 439/344, 676; 174/50, 53, 520, 549
See application file for complete search history.

(56) References Cited

U.S. PATENT DOCUMENTS

| | | | | |
|---|---|---|---|---|
| 4,892,212 | A | 1/1990 | Andreyko | |
| 4,950,840 | A | 8/1990 | Zetena | |
| 5,189,256 | A | 2/1993 | Epple | |
| 5,559,922 | A | 9/1996 | Arnett | |
| 5,574,256 | A | 11/1996 | Cottone | |
| 5,638,947 | A | 6/1997 | Fenne | |
| 5,659,650 | A | 8/1997 | Arnett | |
| 5,735,714 | A | 4/1998 | Orlando et al. | |
| 5,761,368 | A | 6/1998 | Arnett et al. | |
| 6,108,331 | A | 8/2000 | Thompson | |
| 6,222,124 | B1 | 4/2001 | Pritchard et al. | |
| 6,243,526 | B1 | 6/2001 | Garibay et al. | |
| 6,475,022 | B2 | 11/2002 | Tomino et al. | |
| 6,507,322 | B2 | 1/2003 | Fang et al. | |
| 6,566,602 | B1 | 5/2003 | Miller et al. | |
| 6,616,005 | B1 | 9/2003 | Pereira et al. | |
| 6,748,154 | B2 | 6/2004 | O'Leary et al. | |
| 7,027,431 | B1 | 4/2006 | Thompson | |
| 7,059,895 | B2 | 6/2006 | Murano | |
| 2003/0062990 | A1 | 4/2003 | Schaeffer, Jr. et al. | |
| 2004/0013098 | A1 | 1/2004 | Tseng et al. | |
| 2004/0033817 | A1 | 2/2004 | Gorsuch et al. | |
| 2004/0073597 | A1* | 4/2004 | Caveney et al. | 709/200 |
| 2004/0121648 | A1 | 6/2004 | Voros | |
| 2005/0152306 | A1 | 7/2005 | Bonnassieux et al. | |
| 2005/0152323 | A1 | 7/2005 | Bonnassieux et al. | |
| 2006/0201692 | A1* | 9/2006 | Elberson | 174/50 |

OTHER PUBLICATIONS http://www.cisco.com/en/US/products/hw/phones/ps379/prod_installation guide09186a00800a8689.html Printed: Feb. 2, 2006, pp. 1-10.

(Continued)

*Primary Examiner*—Walter F Briney, III
(74) *Attorney, Agent, or Firm*—McCarter & English, LLP

(57) ABSTRACT

An electrical receptacle with an open corner region facilitates electrical connection between an electrical device positioned in the receptacle and a conduit, cable or like wiring that passes through the open corner region. The open corner region is defined by a side wall, top face and rear wall of the receptacle. The receptacle is particularly adapted for use with electrical devices that include a connector that aligns with the open corner region, e.g., an access point.

5 Claims, 6 Drawing Sheets

OTHER PUBLICATIONS http://www.nbxsoftware.com/accessories/wallmount.html, Printed: Feb. 2, 2006, p. 1.

AT&T, User's Manual for 900 MHz Digital Spread Spectrum Cordless Telephone 9400 Part 2, Dec. 1998, 7 Pages.

Product Literature, Wall Phone Jacks, Undated, Single Sheet, Jan. 10, 2007.

PERICOM Semiconductor Corporation, Application of the Week, Application: WiFi Access Point Reference Clocks, Oct. 15, 2003, Week 75, 2 pages.

3com Data Sheet,3Com IntelliJack Switch Family Innovative "in the Wall" Solution: U.S.—Standard, May 2004, 9 pages.

3com Data Sheet,3Com IntelliJack Switch Family Innovative "in the Wall" Solution: U.S.—Standard, Jun. 2004, 4 pages.

http://www.3com.com/products/en_US: 3com Product Details, 3Com IntelliJack Switch NJ220, Jun. 2004, 6 pages.

http://www.3com.com/products/en_US: 3com Product Details, 3Com IntelliJack Switch NJ100, Jun. 2004, 5 pages.

* cited by examiner

ELECTRICAL RECEPTACLE WITH OPEN CORNER REGION

BACKGROUND

1. Technical Field

The present disclosure is directed to a receptacle design that is adapted to be mounted with respect to a structure, e.g., a wall, floor or ceiling, and that facilitates wiring of wiring devices mounted therein. More particularly, the disclosed receptacle design includes an opening in a rearward face that aligns with a rearwardly directed plug and accommodates passage of a cable, cord or the like through such aligned opening for connection to the rearwardly directed plug.

2. Background Art

In the field of communications, technological developments continue to drive the adoption of wireless technologies. For example, it has become commonplace for individuals to employ laptop computers with wireless communication capabilities to access and communicate across networks. Once wireless communication is established with a network, the laptop user can generally establish and/or engage in far reaching network-based communications, e.g., over local area networks, wide area networks, the Internet, etc. The backbone for such network-based communications, e.g., cabling, routers, switches, servers, nodes and the like, are generally known to persons skilled in the art.

Turning specifically to the segment of the communication process that involves wireless communication between an electronic device, e.g., a laptop computer, and a network, e.g., a local-area network (LAN), a wide-area network (WAN), a campus-area network (CAN), a metropolitan-area network (MAN), a home-area network (HAN), and combinations and/or extensions thereof, the wireless connectivity is generally achieved through the transmission and receipt of radio waves and/or microwaves. The electronic device that is to communicate in a wireless fashion typically includes a network interface card (NIC) or like device to support the wireless exchange of data communications. NICs are frequently designed for a particular type of network, protocol and/or media, although some NICs support communications across multiple networks. At the receiving end of the wireless communication, an access point is typically required. The access point typically takes the form of a hardware device and/or computer software that acts as a communication hub for users of a wireless device to connect to a wired network, e.g., a LAN, WAN and/or the Internet.

As used herein, the term "access point" encompasses a hardware device and/or associated software that acts as a communication hub for users of wireless devices to connect to a wired network. Conventional access points generally provide a predetermined level of security for wireless communications that pass through the access point, and extend the physical range of service to which a wireless user has access.

The term "Wi-Fi" is short for wireless fidelity and is meant to encompass any type of 802.11 network, whether 802.11b, 802.11a, 802.11g, dual-band, etc. The term "Wi-Fi" is currently promulgated by the Wi-Fi Alliance. Any products tested and approved as "Wi-Fi Certified" (a registered trademark) by the Wi-Fi Alliance are certified as interoperable with each other, even if they are from different manufacturers. Users with "Wi-Fi Certified" products can use any brand of access point with any other brand of client hardware that also is certified. Typically, however, any Wi-Fi product using the same radio frequency (e.g., 2.4 GHz for 802.11b or 802.11g, and 5 GHz for 802.11a) will work with any other, even if such products are not "Wi-Fi Certified." The term "Wi-Fi" is further intended to encompass future versions and/or variations of the foregoing communication standards. Each of the foregoing standards is hereby incorporated by reference.

A wireless access point thus functions as a bridge between a wired and a wireless network. Wireless access points function like a wireless hub connecting all the wireless devices together and then connecting them to a wired network. A wireless network access point is an essential part of a wireless network in that the access point facilitates connection to the Internet and/or another network. Many wireless access points are now built into wireless routers so that the features of a broadband router and a wireless access point are provided in one unit. Wireless access points generally have differing levels of performance, e.g., different wireless access points perform at varying data transmission speeds. Commercial manufacturers are producing units that offer wireless access functionality. Thus, for example, the NETGEAR (Santa Clara, Calif.) wireless access points have been built into broadband routers. LINKSYS (Irvine, Calif.), D-LINK (Fountain Valley, Calif.) and BELKIN (Compton, Calif.) also manufacture wireless broadband routers that include a built-in wireless access point. Ortronics, Inc. (New London, Conn.) has also offered a wireless access point, the Wi-Jack™, that offers wireless and non-wireless functionalities and is dimensioned/configured for mounting in and/or with respect to a conventional wall box, e.g., a single gang box.

Wireless access points are also appearing in what may be termed "hot spots" in hotels, train stations and airports. These access points are making wireless Internet connectivity available to travelers/individuals who can connect to the Internet or a desired network, e.g., a corporate network via a virtual private network (VPN), through wireless communication technology.

Existing 802.11 access points suffer from various limitations and/or drawbacks. For example, current Wi-Fi access points are generally bulky, need to be connected via a patch cord, and often require an external power cord. Moreover, conventional Wi-Fi access ports are difficult to integrate into a desired environment, and frequently result in a non-desirable and/or unacceptable physical presence in the desired environment.

With reference to the patent literature, commonly assigned U.S. Patent Publication No. 2005/0152306 to Bonnassieux is directed to an advantageous Wi-Fi access point device and system. The disclosed access point facilitates integration of operative aspects of a Wi-Fi access point in a wall using, for example, standard switch and outlet boxes and/or standard wall plates. Wiring structures, such as a 110 block, may be incorporated into the disclosed access point to facilitate connection to a wired network. Further, integration of complementary connections within the access point is supported, for example, data, voice, video, CATV or other like connection types. The entire contents of the foregoing, commonly assigned patent publication are incorporated herein by reference.

A second commonly assigned U.S. Patent Publication No. 2005/0152323 to Bonnassieux et al. discloses a plug-in Wi-Fi access point device and system. In this second patent publication, an access point device is provided that is configured for Wi-Fi communication that may be directly plugged into a face plate/workstation, thereby obviating the need for a patch cord. The disclosed plug-in functionality also offers security from removal by unauthorized personnel, non-obtrusiveness in relation to other face plate/workstation jacks, and the ability to be powered through an Ethernet connection to avoid the need for a separate power source. The disclosed plug-in Wi-Fi access point device includes a housing, Wi-Fi access point circuitry within the housing, and a connector mounted on a face of the housing for direct plug-in into an Ethernet jack of a face plate/workstation. A locking or self-locking mechanism, an integrated hub/switch/router, and the inclusion of at least one integrated voice, video and/or data jack for voice, video or data communication, are also disclosed. The entire contents of the foregoing, commonly assigned patent publication are incorporated herein by reference.

U.S. Pat. Nos. 6,108,331 and 7,027,431 to Thompson discloses an access node or access port that has a plurality of physical connectors on the front face thereof for connection to a variety of signal-receiving and signal-transmitting devices. The Thompson access ports include RJ-45 connectors, RCA connectors, serial connectors, Ethernet connectors, and coaxial cable connectors. Conduits, i.e., signal-carrying media such as media converters, deliver signals to the access port. The signals are converted to and from addressed data packets carried in a packet stream over the conduits. Separate from the access port, a central node or node zero receives signals from outside sources, converts the signals to addressed data packets, and sends the packets over the conduit(s) as a packet stream to the access port. The access port/access node takes packets that are addressed to such access port/access node, converts the packets back into the original signals, then feeds the signals to appropriate connectors on the access port/access node. The Thompson access port/access node is also provided with a transceiver in wireless communication with another transceiver connected to a device outside the node using RF or infrared communication.

Despite efforts to date, a need remains for improved access point designs and access point systems that provide effective wireless functionality, manage heat and power-related issues, and facilitate installation. In addition, a need remains for access point designs and access point systems that support both wireless and non-wireless communications in a compact geometry, e.g., a unit that is sized to mount, in whole or in part, with respect to a conventionally sized wall box. These and other needs are satisfied by the disclosed access point devices and systems, as will be apparent to persons skilled in the art from the description which follows.

SUMMARY OF THE DISCLOSURE

The present disclosure provides advantageous access points, access point systems, and access point-related components, subassemblies and support structures that, alone or in combination, support a host of communication applications. More particularly, the present disclosure provides advantageous access points that include/support wireless functionality, yet may be sized for mounting in or with respect to a conventional wall box. In addition to the noted wireless functionality, the disclosed access points and access point systems generally support one or more jack and/or connector based communication modalities.

Thus, in a first exemplary embodiment of the present disclosure, an access point is provided that includes a plurality of printed circuit boards arranged in a substantially H-shaped or U-shaped configuration. In an exemplary embodiment of the disclosed access point, three (3) printed circuit boards are provided within the access point, such printed circuit boards being in electronic communication with each other so as to provide requisite control and operational processing capabilities. Communication interface members are typically provided to facilitate electrical communication between adjacent circuit boards. According to exemplary embodiments, a jack is positioned in close proximity to the circuit boards and is accessible from the front face of the access point. Thus, a user is able to insert a plug into the jack to facilitate network-based communications. One or more antennae are provided in the access point to support wireless functionality. In addition, a further connector is typically provided to facilitate to permit connection of the access point to associated wired infrastructure. Thus, in an exemplary embodiment, an outwardly directed plug extends from the access point and facilitates communication with external sources, e.g., network-related communications and the like.

In exemplary embodiments of the present disclosure, the outwardly directed connector takes the form of an outwardly/rearwardly directed plug that is advantageously formed from a printed circuit board and a plug housing. The circuit board is adapted to slide into the plug housing and become latched/locked therein. Thus, regardless of the overall size/dimensional characteristics of the circuit board, at least a portion or region of the circuit board is sized and dimensioned to cooperate with the plug housing in the manner described herein. A plurality of exposed contacts, e.g., eight, are provided on the printed circuit board, and such contacts are adapted to be exposed in channels defined by the plug housing. The exposed contacts are advantageously in electrical communication with the traces on the printed circuit board and, through such traces, with other electronic components associated with the disclosed access point. The circuit board/plug housing subassembly may be advantageously integrated into an access point design, as described herein, are employed independent therefrom, e.g., in connection with other electronic devices and/or assemblies.

The circuit boards associated with the disclosed access points are adapted to support and manage the various functionalities of the access point, e.g., the receipt, processing and transmission of signals, power processing and management, and the generation of signals reflecting operative conditions and the like. The H-shaped or U-shaped configuration of the circuit boards disclosed herein permits advantageous space utilization and permits the disclosed access points to be utilized in conjunction with a conventional electrical box, e.g., a single gang wall box, while supporting a full range of access point functionalities, including the processing of both wireless and wired communications.

In a further aspect of the present disclosure, an advantageous electrical box receptacle is disclosed. The receptacle defines an open corner region in the rear thereof. The open corner region facilitates wiring connections associated with electrical components that may be introduced thereto, e.g., access points of the type disclosed herein. Thus, for example, an outwardly/rearwardly directed plug associated with an exemplary access point of the present disclosure may engage a jack in the open corner region of the disclosed receptacle, thereby enhancing the ease of wiring and avoiding potential damage to the electrical components in the mating region.

Additional advantageous features and functions of the disclosed devices, systems and methods will be apparent from the detailed description which follows, particularly when read in conjunction with the appended figures.

BRIEF DESCRIPTION OF THE FIGURES

To assist those of ordinary skill in the art in making, installing and using the disclosed access points and access point systems, including assemblies and subassemblies thereof, and exemplary wall receptacles for receipt and/or support of access point devices (and other communication devices), reference is made to the accompanying drawings, wherein.

DESCRIPTION OF EXEMPLARY EMBODIMENT(S)

Figure 1:
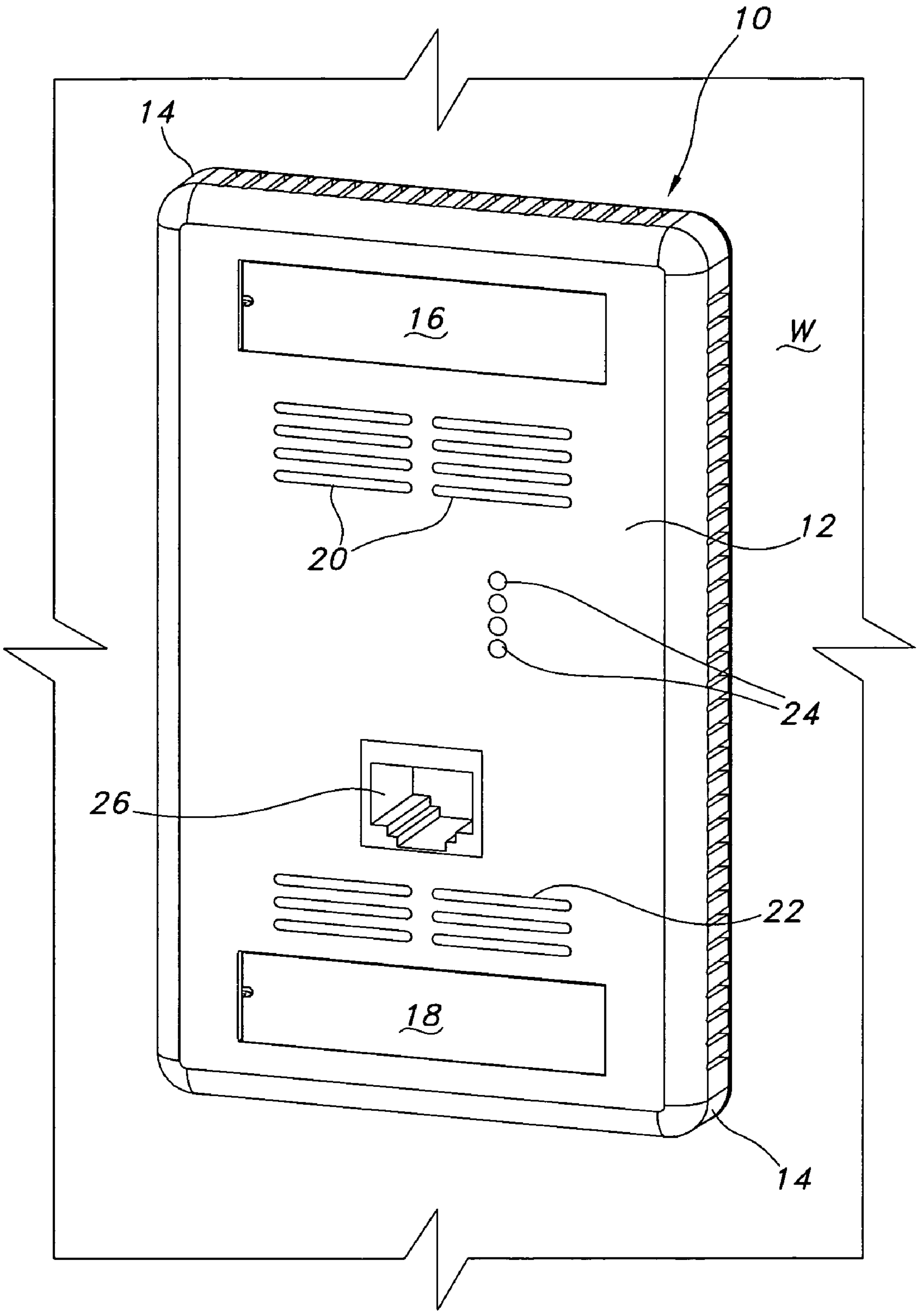
FIG. 1 is a front view of an exemplary access point device mounted with respect to a wall according to the present disclosure.

As described herein with reference to exemplary embodiment(s), the present disclosure provides access points, access point systems and access point-related components, subassemblies and support structures that, alone or in combination, support a host of communication applications. The disclosed access points and access point systems include and/or support wireless functionality. Thus, in exemplary embodiments of the present disclosure, the disclosed access points include one or more antennae that are adapted to transmit and receive wireless communications. The disclosed access points also include a printed circuit board layout that supports, inter alia, the disclosed antennae and a full range of signal/data processing functionalities, e.g., Ethernet-based signal transmission/receipt functionalities. Power is delivered to the disclosed access point components through Power-over-Ethernet (PoE) techniques, as are known in the art.

As used herein, “Power-over-Ethernet” or PoE technology refers to any system to transmit electrical power, along with data, to remote devices over standard twisted-pair cable in an Ethernet network. PoE technology is particularly useful for powering IP telephones, wireless LAN access points, webcams, Ethernet hubs, computers, and other appliances. Power-over-Ethernet is currently standardized in IEEE 802.3af. According to the IEEE 802.3af standard, 48 volts DC is provided over two pairs of a four-pair cable at a maximum current of 350 mA for a maximum load power of 15.4 watts. A modified standard that may increase power and/or current specifications is under discussion (IEEE 802.3at). Before applying power, an IEEE 802.3af power source first determines if a remote device can accept power, and if so, which pairs should be used to supply it. If an open or a short circuit is detected, no power is applied so as to protect devices that do not support IEEE 802.3af and/or otherwise are not calling for power. The IEEE 802.3af standard is incorporated herein by reference.

In exemplary embodiments of the disclosed access point, network communication is effected through a cable, cord or other data communication conduit that engages an outwardly directed plug associated with the disclosed access point. Exemplary plugs of the present disclosure include an integral printed circuit board which contributes to the support of the access point’s functionality and, in disclosed embodiments, cooperates with one or more additional printed circuit boards positioned within the access point to provide such support. In exemplary embodiments, the plug is rearwardly directed from the access point housing and aligns with an opening defined in an advantageous receptacle, e.g., a receptacle that is adapted for wall mounting. The receptacle opening facilitates passage of one or more cables, wires, cords and/or other conduits and mating of such conduit with a connector associated with the access point, e.g., a rearwardly directed plug. Indeed, in an exemplary embodiment, a single cable/conduit is fed through the receptacle opening, such cable/conduit including a jack that is adapted to engage a rearwardly directed plug associated with the access point. In this way, installation/wiring of the disclosed access point is further facilitated.

With reference to FIG. 1, an exemplary access point 10 mounted to a wall “W” is depicted. Although access point 10 is depicted in conjunction with a wall W, it is to be understood that access point 10 may be mounted with respect to a variety of surfaces and structures, e.g., a ceiling, floor, cabinet, furniture console, desk, credenza and the like. Access point 10 is substantially rectangular in geometry and thereby substantially conforms to the geometry of conventional wall boxes, e.g., a single gang wall box. Access point 10 includes a front housing member 12 that functions, in part, as a face-plate for the disclosed access point. Front housing member 12 may define radiused corners 14 for enhanced aesthetics. First and second covers 16, 18 are mounted to front housing member 12 after access point 10 is mounted with respect to wall W, thereby covering the mounting screws and/or other mounting components used to secure access point 10 with respect to wall W.

A plurality of vent openings are generally defined in the front face of front housing member 12 to facilitate cooling of the componentry positioned within access point 10. Thus, in the exemplary embodiment of FIG. 1, front housing member 12 includes a plurality of vertically spaced elongated vent slots 20, 22. Vent slots 20 are positioned toward the top of front housing member 12 adjacent first cover 16, and vent slots 22 are positioned therebelow, adjacent second cover 18. Alternative venting arrangements may be implemented, as will be apparent to persons skilled in the art. Generally, vent openings are positioned so as to facilitate effective cooling air flow through front housing member 12 and past the operative components positioned within access point 10.

A plurality of indicator windows 24 are positioned on the front face of front housing member 12. Indicator windows 24 generally take the form of light passage elements and, as described with reference to the exploded view of FIG. 3 below, may cooperate with light pipes and/or other structures, e.g., LEDs, to fulfill the signaling function contemplated therefor. Thus, in an exemplary embodiment of the present disclosure, the disclosed access point 10 includes internal circuitry and/or programming that generates light signal(s) in response to the receipt and/or transmission of data. As will be apparent to persons skilled in the art, the number, positioning and operation of indicator windows 24 may be varied based on the desired indicia/information to be communicated to system users.

An RJ-45 jack 26 is also mounted with respect to and accessible at the front face of front housing member 12. Jack 26 may take a variety of forms, although a jack that meets high-end performance standards is preferred, e.g., a jack that is CAT 6, CAT 5e and/or CAT 5 compliant. As is well known in the art, RJ-45 jack 26 is adapted to receive/engage a corresponding plug (not pictured) for data communication therebetween. Although exemplary access point 10 features a single RJ-45 jack 26, it is contemplated that one or more additional jacks/connectors may be accessible at the front face of front housing member 12. Once a plug is mounted in RJ-45 jack 26, data and/or power may be transmitted to an electronic device associated with the plug, e.g., a computer, printer, server, or other device/instrument, based on PoE technology as described above. Although RJ-45 jack 26 is centrally positioned above vent slots 22, alternative location(s) may be selected on the front face of front housing member 12, as will be apparent to persons skilled in the art. Generally, RJ-45 jack 26 is aligned with cavity 108 of rear housing 106 (as described below) so as to minimize the depth of access point 10 relative to the wall or other structure upon which it is mounted.

Figure 2:
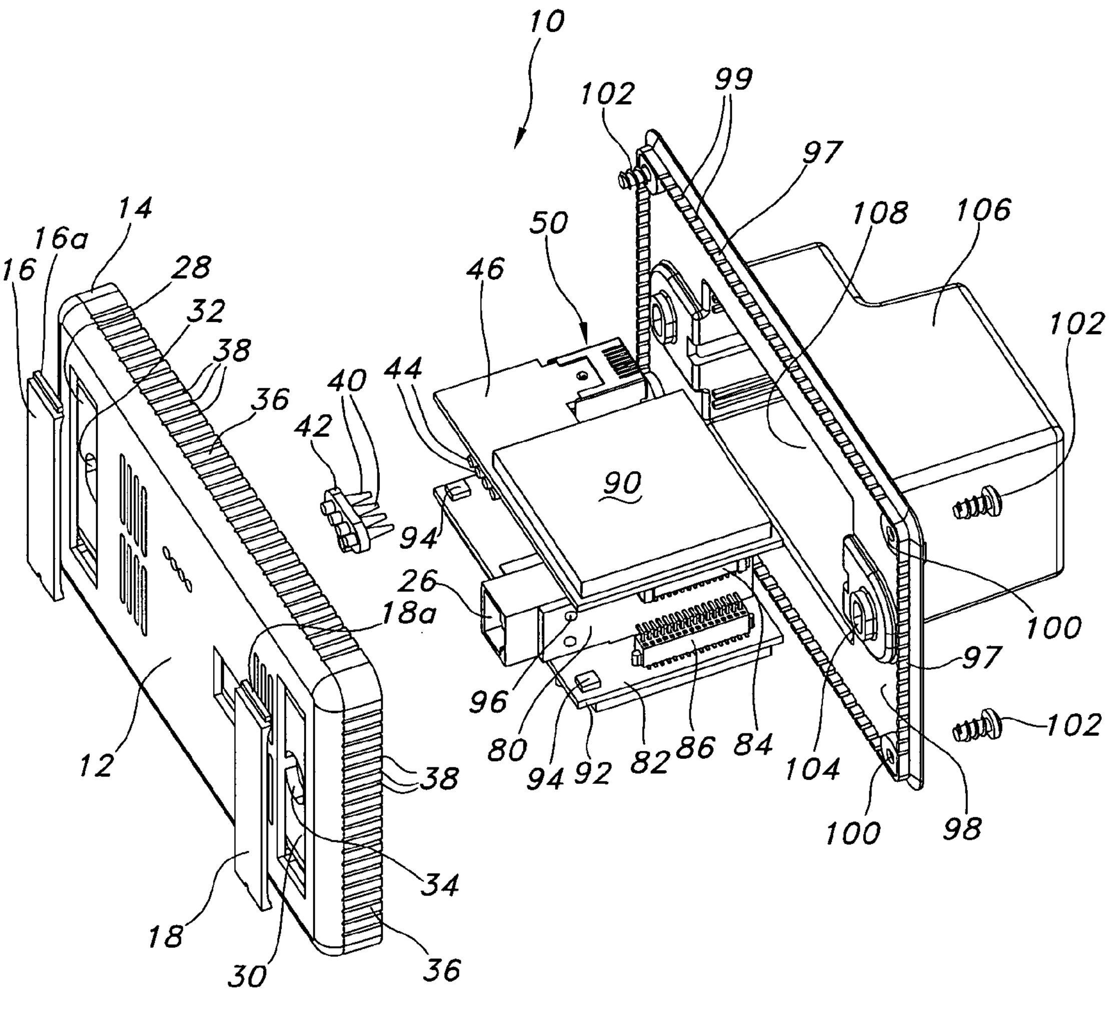
FIG. 2 is a partially exploded view of an exemplary access point device according to the present disclosure.

Turning to FIG. 2, a partially exploded side view of access point 10 is provided. Covers 16, 18 are separated from front housing member 12, thereby revealing internal cavities 28, 30 and mounting apertures 32, 34, respectively. Screws or other mounting members (not pictured) generally cooperate with mounting apertures 32, 34 to detachably secure access point 10 with respect to a wall or other structure. In addition, exemplary edge features, e.g., mounting ledges 16*a*, 18*a*, that facilitate detachable mounting of covers 16, 18 relative to front housing member 12 are apparent in FIG. 2. Front housing member 12 also defines side walls 36 that define a plurality of venting notches 38. Venting notches 38 further facilitate cooling air flow through access point 10, while simultaneously providing a pleasing aesthetic appearance to access point 10.

A plurality (4) of light delivery elements 40 for cooperation with indicator windows 24 on the front housing member 12 are assembled as a subassembly by positioning each light delivery element 40 within a cooperative aperture in assembly plate 42. Light delivery elements 40 cooperate with corresponding light channels or LEDs 44 that are mounted with respect to and are in electronic communication with a first printed circuit board 46 within access point 10. Assembly plate 42 generally functions to facilitate handling and assembly of the light delivery elements 40 relative to indicator windows 24 and LEDs/light channels 44 of exemplary access point 10.

Figure 6:
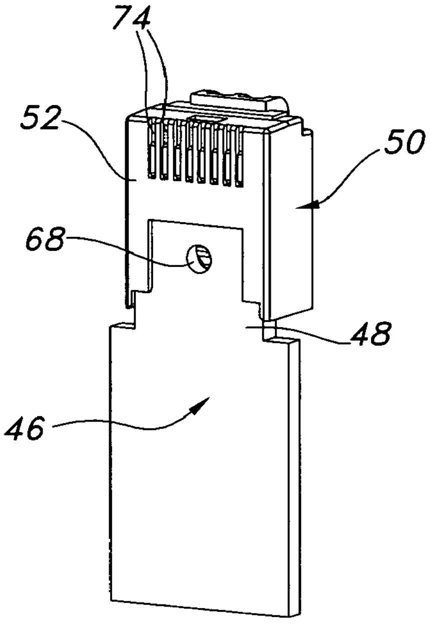
FIG. 6 is a side view of an exemplary printed circuit board and jack housing subassembly according to an aspect of the present disclosure.
Figure 7:
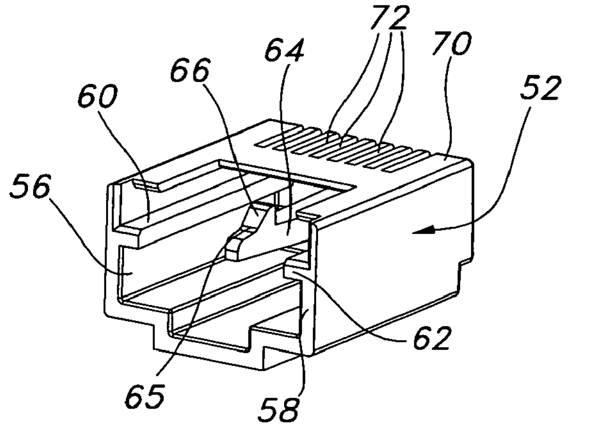
FIG. 7 is a rear plan view of an exemplary jack housing according to an aspect of the present disclosure.
Figure 8:
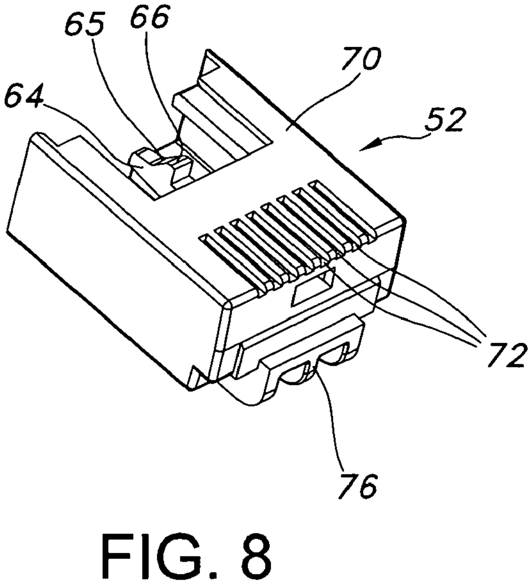
FIG. 8 is a front plan view of the exemplary jack housing of FIG. 7.

With reference to FIGS. 2 and 6-8, first printed circuit board 46 cooperates with and is mounted to a plug housing 52 to define a plug member 50 at a rearward and/or outward portion of access point 10. Thus, with particular reference to FIGS. 6-8, exemplary embodiments of the present disclosure include an integrally defined printed circuit board and RJ-45 plug, such that data communication with the printed circuit board and the associated components of access point 10 is greatly facilitated. Of note and with particular reference to FIG. 6, printed circuit board 46 is schematically depicted therein for purposes of describing the interaction of circuit board 46 with plug housing 52. For illustration purposes, the full geometry and dimensional characteristics of exemplary printed circuit board 46 are not reflected in FIG. 6, as is apparent from a comparison with FIG. 2. However, FIGS. 6-8 are particularly useful in describing the assembly and operation of exemplary plug housing 52 and associated printed circuit board 46 to define plug 50.

As best seen in FIGS. 7 and 8, plug housing 52 is generally sized in a manner consistent with RJ-45 dimensional requirements and defines an internal cavity 54. Printed circuit board 46 defines an upper portion 48, the width of which is selected so as to cooperate with the internal width of cavity 54. Internally stepped side walls 56, 58 define sliding surfaces 60, 62 upon which upper portion 48 may slide when brought into engagement with plug housing 52. A locking structure 64 is positioned within cavity 54 and includes a locking tooth 66 that is downwardly deflectable. With reference to FIG. 7, a corresponding locking aperture 68 is formed in the upper portion 48 of printed circuit board 46. Top face 70 of plug housing 52 defines eight (8) aligned channels for alignment with exposed contacts 74 formed on the end region of the printed circuit board's upper portion 48. The exposed contacts 74 are in electrical communication with traces (not pictured) that traverse printed circuit board 46. A lower extension structure 76 is formed on or by plug housing 52, such that the overall geometry of plug housing 52 corresponds to a conventional RJ-45 geometry. Thus, when printed circuit board 46 is assembled with plug housing 52, the exposed contacts of printed circuit board 46 are available for electrical communication with a corresponding jack, such that an advantageous RJ-45 plug 50 is defined by the combination of circuit board 46 and plug housing 52.

To assemble an exemplary embodiment of the disclosed printed circuit board and plug housing so as to define an RJ-45 plug subassembly, a printed circuit board is generally provided having the following features/characteristics: (i) exposed contacts (8) that are configured and dimensioned to align with the slots formed in the plug housing, (ii) an appropriate width to slide in the region defined within the plug housing, e.g., between stepped side walls thereof, (iii) a thickness that will be accommodated, e.g., slide, within the plug housing, e.g., in the region defined between slide surfaces formed by stepped side walls and the top face of the plug housing, and (iv) a locking aperture formed in a location to cooperate/engage with a corresponding locking tooth formed in the plug housing. Alternative locking mechanisms/techniques may be employed to secure the printed circuit board with respect to the plug housing, as will be readily apparent to persons skilled in the art, e.g., detent features formed on the stepped side walls of the plug housing.

Assembly of exemplary plug 50 generally involves sliding a printed circuit board along sliding surfaces defined by the stepped side walls of plug housing 52, with locking tooth 66 deflected downward. A ramped surface 65 is provided to facilitate downward deflection of locking tooth 66 as circuit board 46 is introduced to plug housing 52. Once printed circuit board 46 is advanced to the desired location relative to plug housing 52 (i.e., with the exposed contacts available for electrical communication with a corresponding RJ-45 jack), the locking tooth 66 is brought into alignment with aperture 68 and deflects into engagement with such aperture 68 formed in printed circuit board 46. In exemplary embodiments of the present disclosure, the printed circuit board 46 is approximately 1.6 mm in thickness (or less) in the region to be introduced to plug housing 52. The portion of the plug housing cavity that is below the printed circuit board (i.e., opposite the exposed contacts) may accommodate additional electrical components that may be mounted to printed circuit board 46, e.g., component(s) for noise reduction and the like.

With further reference to the exploded view of FIG. 2, printed circuit board 46 contains only a portion of the circuitry required to support the function of access port 10. Thus, a pair of additional printed circuit boards 80, 82 are in electrical communication with printed circuit board 46. Electrical communication between the traces on the respective printed circuit boards 46, 80, 82 is effected by communication interface members 84, 86. Thus, printed circuit board 46 is in electrical communication with printed circuit board 80 (and vice versa) through interface member 84. Similarly, printed circuit board 80 is in electrical communication with printed circuit board 82 (and vice versa) through interface member 86. Generally, printed circuit boards 46 and 82 can only communicate with each other via intermediate printed circuit board 80. The three printed circuit boards define a substantially H-shape or U-shape configuration, with interface members 84, 86 positioned within the confines of the H-shaped or U-shaped region. Intermediate circuit board 80 is generally secured to the underside of jack 26, e.g., with a bolt, rivet or other attachment means 96.

Additional electrical components, e.g., capacitors, resistors, inductors, additional circuit board elements and the like, may be mounted with respect to one or more of the circuit boards. Such additional electronic components are schematically depicted by members 90, 92. Although members 90, 92 are unitary in appearance, it is to be understood that such schematic depictions encompass a host of individual electrical components, as will be readily apparent to persons skilled in the art. The close spatial relationship between jack 26, circuit boards 46, 80, 82 (jack 26 is generally bounded by the three circuit boards) and additional electronic components 90, 92 facilitates efficient communication therebetween.

A pair of antenna are generally associated with access device 10 to support wireless communication functionalities. The antennae (not pictured) are generally secured to the inner face of front housing member 12, thereby conserving space and positioning antennae for unobstructed communication with devices/transmitters positioned in the vicinity of access point 10. A variety of mounting techniques may be employed, e.g., the inclusion of guide slots/tracks on the inner face of front housing member 12 to receive/secure each antenna. A screw/nut arrangement 94 is used to secure leads that extend from the antennae with respect to printed circuit boards 46, 82, respectively, although alternative means for achieved electrical connection between the antennae and the printed circuit boards may be employed. The antennae are generally of conventional design although, in exemplary embodiments of the present disclosure, the antennae advantageously provide dual band omni-directional functionalities that support communications pursuant to both IEEE 802.11b/g and 802.11a standards. IEEE 802.11 sets forth the general Wi-Fi communication standards and includes a series of amendments, namely the b, a, and g amendments to the original standard. The 802.11b and 802.11g standards use the 2.4 gigahertz (GHz) band, whereas the 802.11a standard uses the 5 GHz band.

The antennae derive their power from the respective printed circuit boards 46, 82. The requisite power is derived from the network to which the access point is connected as power-over-Ethernet. Thus, neither a separate power source nor a separate power cable is required to power the access point, including specifically the transceiving components thereof. Of note, in circumstances where both wireless communication modes are being called upon simultaneously (i.e., wireless communications are being received and/or transmitted at both 2.4 and 5 GHz) within access point 10, additional heat is typically generated due to the simultaneous operation of electronic components and circuitry associated with the processing of both communication modes. According to exemplary embodiments of the present disclosure, a temperature sensor (not pictured) is mounted with respect to at least one of the circuit boards 46, 80, 82. Control circuitry associated with the printed circuit board(s) monitors the temperature readings of the temperature sensor and, if the temperature reaches a predetermined threshold that may impact upon the stability and/or operation of access point 10, operations of the access point are restricted so as to reduce power draw/heat generation. Thus, in an exemplary embodiment of the present disclosure, if the control circuitry senses a temperature that exceeds the predetermined threshold, the speed with which the dual mode operations are processed may be moderated/reduced so as to reduce the power needs of access point, thereby reducing heat generation and the associated temperature internal to access point 10. Once the temperature drops below a second predetermined threshold, the control circuitry typically withdraws the previously implemented power restriction, thereby permitting the access point 10 to return to full operation. Of note, the response of the control circuitry need not operate as a "step function", but may moderate the power usage of access point 10 at a variable level based on algorithmic control functions associated with such control circuitry.

Exemplary access point 10 further includes a rear plate 98 that cooperates with front housing member 12 and generally corresponds to the rectangular geometry of front housing member 12. Slots 99 formed in the side walls 97 of rear plate 98 cooperate with the corresponding venting notches 38 of front housing member 12 to promote air flow and the overall aesthetic appearance of exemplary access point 10. Screws 102 cooperate with apertures 100 and secure rear plate 98 with respect to front housing member 12, thereby encasing the operative components of access point 10 therewithin. A rear housing 106 is mounted with respect to rear plate 98 by a bolt/flange arrangement 104 or other connection means. Alternatively, rear housing 106 may be integrally formed with rear plate 98, e.g., through an appropriate molding operation.

Rear housing 106 is configured and dimensioned to fit within a conventional wall box, i.e., a single gang box. Despite the geometric and dimensional constraints placed on rear housing 106, a cavity 108 is defined by rear housing 106 that is of sufficient size/volume to accommodate operative components of access point 10, including specifically the three circuit boards 46, 80, 82, the additional electronic components 90, 92, at least the rearward portion of jack 26, and the rearwardly directed plug 50. As noted previously, the antennae are generally mounted to the front housing member 12 and, as such, are not received within cavity 108. In addition, the overall internal layout and geometry of access point 10 is effective to achieve desired air flow/cooling to avoid issues associated with potential overheating of components. In exemplary embodiments, heat management is further achieved through the temperature sensor and control circuitry associated with the printed circuit board(s).

In use, access point 10 is assembled in the manner shown in FIG. 2, with jack 26 exposed at the front and plug 50 exposed in the rear. A cable, conduit or other appropriate wiring is fed to the electrical box that is to receive the access point, e.g., a wall box. The cable/conduit is provided with an RJ-45 jack so as to mate with the outwardly/rearwardly directed plug 50 associated with the disclosed access point 10. The cable/conduit is also generally in electrical communication with one or more network components, e.g., one or more switches, routers, servers and the like. In an exemplary embodiment of the present disclosure, the cable/conduit is in communication with, inter alia, a wireless controller, e.g., a mobility controller available from Aruba Networks (Sunnyvale, Calif.), so as to support wireless communications by and through access point 10.

Once the cable/conduit is electrically connected to the access point by engaging plug 50 with the associated jack, the rear housing 106 is generally advanced into the electrical box such that the rear plate 98 is brought into contact with the wall or other surface with respect to which it is being mounted. Access point 10 is then typically mounted with respect to the standard mounting apertures on the electrical box, the covers 16, 18 are snapped into place, and the access point 10 is ready for operation. Users can snap an RJ-45 plug into jack 26 and/or engage in wireless communication via access point 10, thereby gaining network access in a wireless manner. In exemplary embodiments, users are able to engage in wireless communications at both 2.4 GHz (IEEE 802.11b/g) and 5 GHz (IEEE 802.11a).

In operation, the printed circuit boards 46, 80, 82 generally provide the circuitry to support operation of access point 10, including specifically: (i) the receipt and processing of data transmissions transmitted from a cable/jack that is connected with outwardly/rearwardly directed RJ-45 plug 50, e.g., data input from an associated network and wireless control system, (ii) the delivery of the data transmissions to the RJ-45 jack 26, (iii) the wireless transmission and receipt of data by way of the antennae, (iv) the processing of power received from the cable/jack connected to RJ-45 plug 50, i.e., power-over-Ethernet, (v) the control of indicators 40, 44, (vi) temperature control operations, and (vii) related processing operations.

Figure 3:
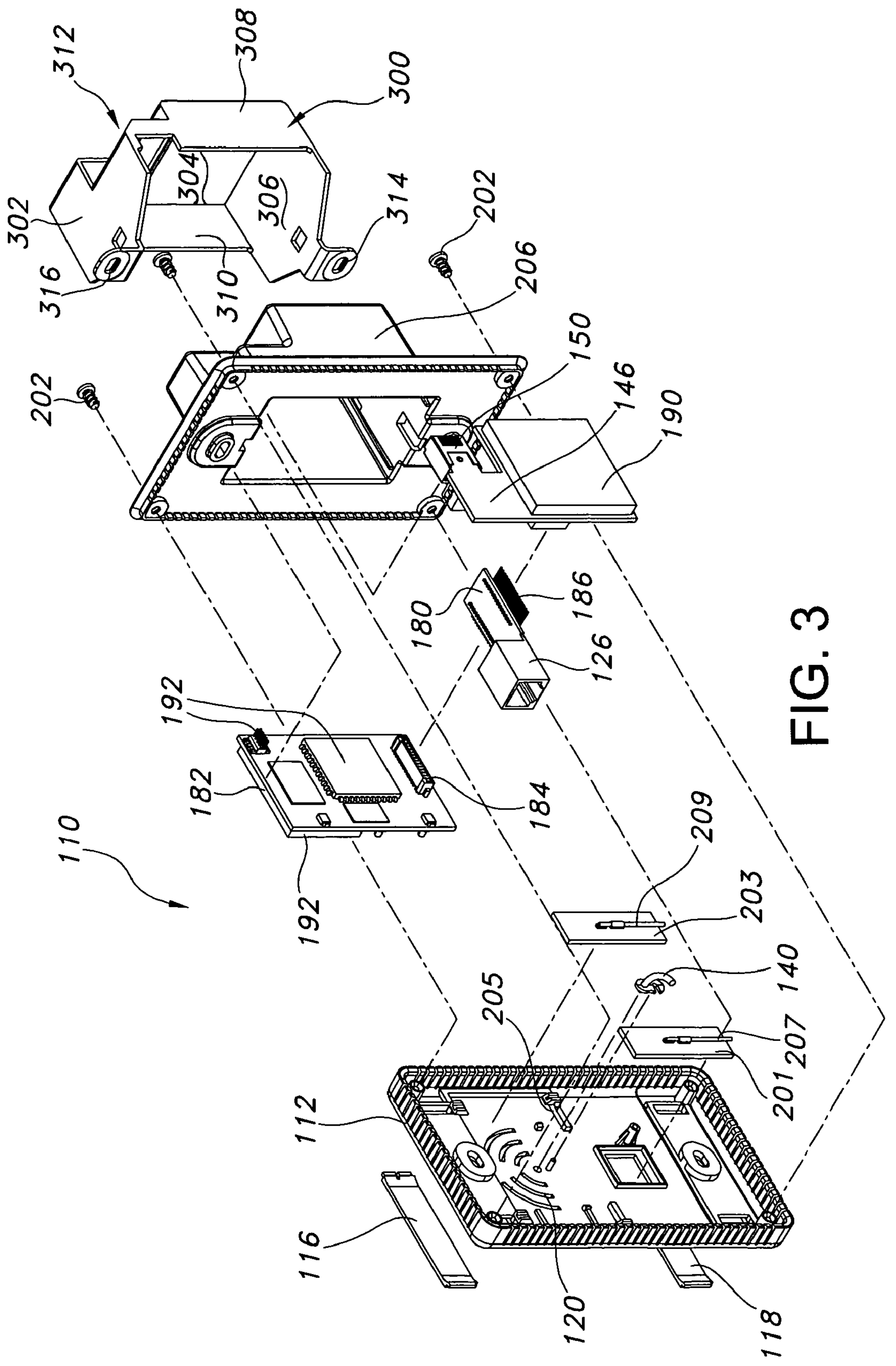
FIG. 3 is an exploded view of a second exemplary access point device and associated wall-mounting receptacle according to the present disclosure.
Figure 4:
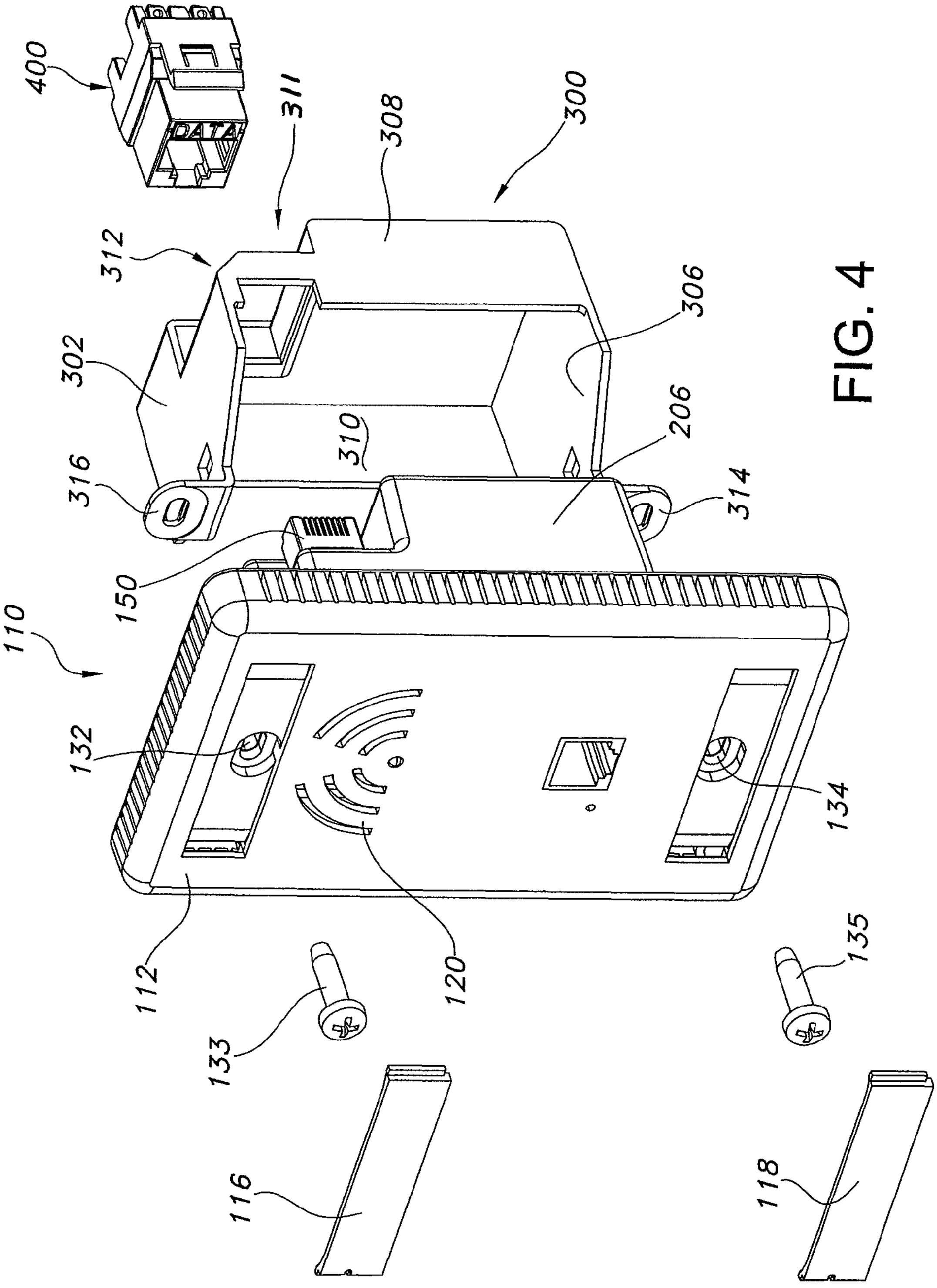
FIG. 4 is a partially exploded front view of the second exemplary access point device and associated wall-mounting receptacle of FIG. 3.

Turning to FIGS. 3 and 4, a second exemplary access point 110 is schematically depicted in exploded form. To the extent components and/or features associated with access point 110 may be associated with a corresponding component and/or feature of access point 10, such component/feature has been identified by a designation incremented by 100. Thus, access point 110 includes a front housing member 112 that includes internal cavities that are adapted to be obscured by covers 116, 118. Screws 133, 135 may be used to mount access point 112 with respect to receptacle 300, as described in greater detail below. Vent slots 120 are formed in front housing member 112 and are of a substantially arcuate configuration. As noted previously, alternative venting slot configurations may be employed, e.g., for aesthetic purposes, as will be apparent to persons skilled in the art.

With particular reference to FIG. 4, access point 112 includes three printed circuit boards 146, 180, 182 that are adapted to be assembled in a substantially H-shaped or U-shaped configuration. Communication interface members 184, 186 facilitate electrical communication between circuit boards 180, 182 and circuit boards 146, 180, respectively. Light pipe 140 transmits signal illumination to an indicator location on the face of front housing member 140 and, in exemplary embodiment, sits on or in close juxtaposition to an LED positioned on one of the circuit boards 146, 180, 182. In the exemplary embodiment of FIGS. 3 and 4, a single indicator is employed, rather than the multiple indicators disclosed with reference to exemplary access point 10. Additional electrical components 190, 192 are mounted with respect to printed circuit boards 146, 182, respectively. As shown with respect to printed circuit board 182, such additional electrical components 192 may be mounted on either side (or both sides) thereof.

A pair of antennae 201, 203 are mounted to the internal side of front housing member 112 in a spaced manner, i.e., with one toward the left side of front housing member 112 and the other toward the right side of front housing member 112. Mounting channels 205 are defined on the inner side of front housing member 112 to accommodate the antennae, although alternative mounting techniques may be employed, as will be readily apparent to persons skilled in the art. Each antenna 201, 203 includes a connecting member 207, 209, respectively, for effecting electrical communication between the antenna and the printed circuit boards 146, 180, 182. As with access point 10 described above, the antennae 201, 203 are advantageously adapted to transmit and receive wireless communication in dual-mode, i.e., at both 2.4 GHz (IEEE 802.11b/g) and 5 GHz (IEEE 802.11a).

As with access point 10 described above, the circuit boards 146, 180, 182 and associated components, e.g., interface members 184, 186, electrical components 190, 192 and jack 126, of access point 110 is advantageously effected within the dimensions and geometry of a conventional electrical box, e.g., a one-gang wall box. Thus, access point 110 includes a rear housing 206 that is configured and dimensioned to fit within such electrical box, and the noted access point components may be advantageously positioned therewithin.

As with access point 10, the alternative exemplary access point 110 is effective in supporting network-based communications, e.g., in a wired form via jack 126 and/or in a wireless form via the wireless functionality supported by antennae 201, 203 and the associated circuitry/capabilities associated with access point 110. Power is supplied to access point 110 in a PoE form, i.e., it is delivered to access point 110 over the cable/conduit in electrical communication with outwardly/rearwardly directed plug 150. Signal, power and related processing management functions are achieved by the printed circuit boards 146, 180, 182 (and associated electrical components 190, 192).

Figure 5:
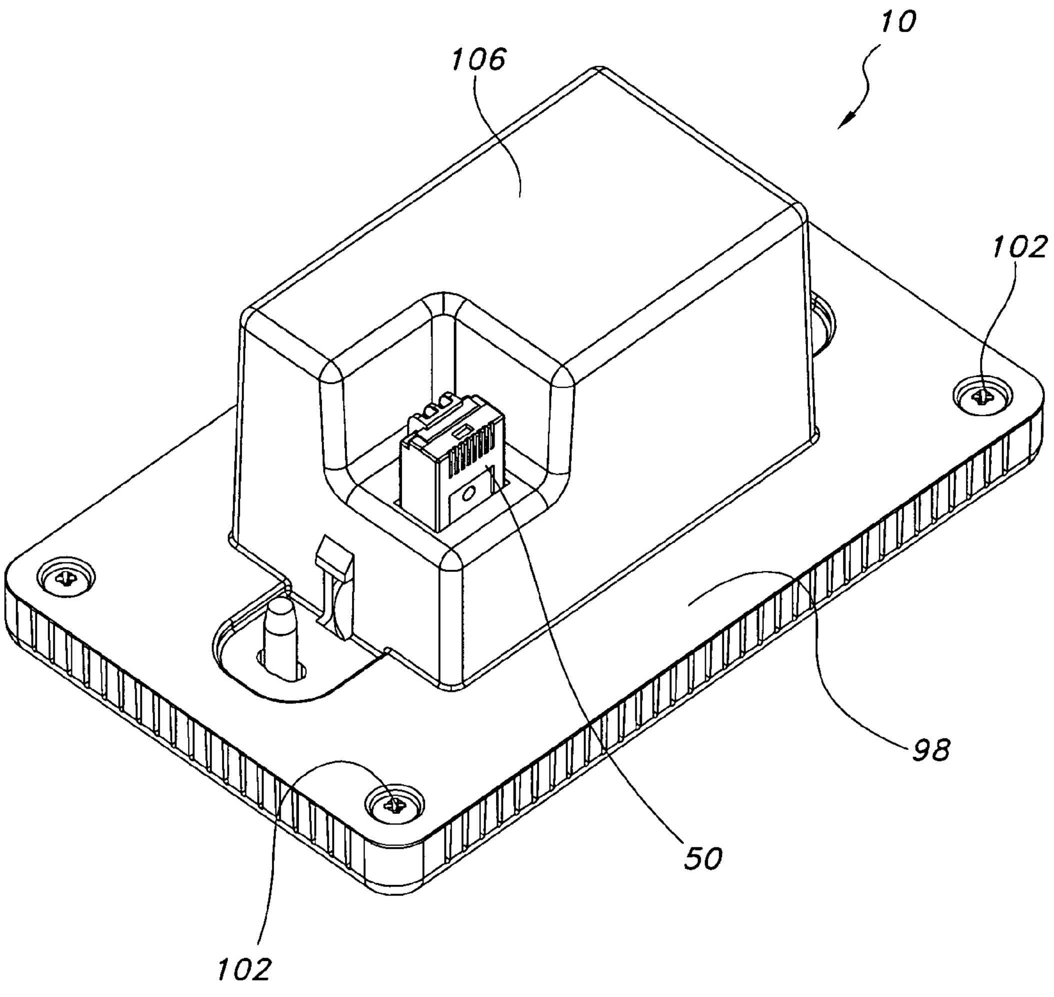
FIG. 5 is a rear view of an exemplary access point device of the present disclosure.

With further reference to FIGS. 3 and 4, an advantageous receptacle 300 is schematically depicted. Receptacle 300 includes a base 306, side walls 308, 310, top face 302 and rear wall 304. Upper and lower mounting apertures/flanges 316, 314 are defined by receptacle 300 to facilitate interaction with an electrical device, e.g., an access point 10, 110. Unlike conventional electrical receptacles, however, receptacle 300 defines an open corner region 312 that facilitates engagement of a plug/jack, e.g., plug 150 of access point 110, and jack 400 (see FIG. 4). Thus, the open corner region 312 of exemplary receptacle 300 is defined by incomplete side wall 308 which is substantially L-shaped, incomplete rear wall 304 which is substantially L-shaped, and incomplete top face 302 which is substantially L-shaped, such that a block-shaped open region is defined. Opening 311 communicates with the block-shaped open region and accommodates passage of outwardly/rearwardly directed plug 150 (see interaction of rear housing 106 with plug 50 in FIG. 5).

Receptacle 300 is particularly advantageous for use with exemplary access points 10, 110 because, inter alia, the outwardly/rearwardly projecting plug 50, 150 protrudes into and/or aligns with the open corner region 312 of receptacle 300. As shown in the rear view of FIG. 5, plug 50 (which, for present purposes, is identical to plug 150) protrudes into a block-like cavity region. The block-like cavity region defined at the rear of and external to access point 10 substantially corresponds to the open corner region 312 defined by receptacle 300. Due to this geometric and dimensional correspondence, access to plug 50, 150 is greatly facilitated and connection to a jack, e.g., jack 400, can be accomplished with ease and without potential damage to either the plug or jack assemblies, e.g., damage caused by aggressive manipulation and/or bending.

In sum, the present disclosure provides advantageous access point devices, access point systems and associated assemblies, subassemblies and support structures. Although the devices, systems and methods of the present disclosure have been described with reference to exemplary embodiments thereof, the present disclosure is not limited to or by such exemplary embodiments. Rather, the devices, systems and methods of the present disclosure may be subjected to various enhancements, modifications and/or variations without departing from the spirit or scope of the present disclosure. Accordingly, the scope of the present disclosure is expressly intended to encompass such enhancements, modifications and/or variations within the scope of the claims set forth herein.

The invention claimed is:

1. An electrical receptacle, comprising:

a base, a first substantially L-shaped side wall, a second side wall, a substantially L-shaped top face and a substantially L-shaped rear wall that define an enclosure for receipt of at least an outwardly directed plug, wherein the first substantially L-shaped side wall, the substantially L-shaped top face and the substantially L-shaped rear wall define an open corner region, and wherein an opening is defined by the enclosure that is in communication with the open corner region and that is adapted to accommodate positioning of at least a portion of the outwardly directed plug therewithin.

2. An electrical receptacle according to claim 1, wherein the receptacle includes mounting flanges that define apertures for receipt of mounting screws.

3. In combination, a. an electrical receptacle that includes a base, a first substantially L-shaped side wall, a second side wall, a substantially L-shaped top face and a substantially L-shaped rear wall that define an enclosure, wherein the first substantially L-shaped side wall, the substantially L-shaped top face and the substantially L-shaped rear wall define an open corner region and wherein an opening is defined by the enclosure that is in communication with the open corner region; and b. an electrical device that includes a rearwardly directed connector positioned within the enclosure, wherein the rearwardly directed connector substantially aligns with the open corner region of the electrical receptacle and is positioned at least in part within the opening defined by the enclosure.

4. The combination of claim 3, wherein the electrical device is an access point.

5. The combination of claim 4, wherein the access point supports wireless functionality.

* * * * *